United States Patent
Zhang

(10) Patent No.: US 9,207,865 B2
(45) Date of Patent: Dec. 8, 2015

(54) INFORMATION PROCESSING METHOD AND TERMINAL DEVICE

(71) Applicant: HUAWEI DEVICE CO., LTD., Shenzhen (CN)

(72) Inventor: Xufeng Zhang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 111 days.

(21) Appl. No.: 14/051,637

(22) Filed: Oct. 11, 2013

(65) Prior Publication Data

US 2014/0035822 A1 Feb. 6, 2014

Related U.S. Application Data

(63) Continuation of application No. PCT/CN2011/072607, filed on Apr. 11, 2011.

(51) Int. Cl.
*G06T 11/00* (2006.01)
*G06F 3/0489* (2013.01)
*G06F 3/023* (2006.01)

(52) U.S. Cl.
CPC .......... *G06F 3/04897* (2013.01); *G06F 3/0236* (2013.01)

(58) Field of Classification Search
CPC ............ G06F 3/04886; G06F 3/04883; G06F 3/0482; G06F 3/0237; G06F 3/0236; G06F 3/0481; G06F 3/0488; G06F 3/018; G06F 3/0233; H04N 21/482; H04N 5/44543; H04N 21/4312; H04N 21/4316; G06Q 20/10
USPC ............................ 345/172–179, 467; 715/863
See application file for complete search history.

(56) References Cited

U.S. PATENT DOCUMENTS 8,253,690 B2 * 8/2012 Wang .................... G06F 3/0234
345/168
2007/0046641 A1 3/2007 Lim
(Continued)

FOREIGN PATENT DOCUMENTS

| CN | 1694049 A | 11/2005 |
| CN | 1877499 A | 12/2006 |

(Continued)

OTHER PUBLICATIONS

Chinese Office Action issued Feb. 21, 2012 in Chinese Patent Application No. 201180000341.3.
(Continued)

*Primary Examiner* — Kent Chang
*Assistant Examiner* — Nelson Rosario
(74) *Attorney, Agent, or Firm* — Staas & Halsey LLP

(57) ABSTRACT

Embodiments of the present invention relate to an information processing method and a terminal device, where the method includes: receiving an input character input by a user; displaying, according to the input character and in a ring arrangement around the input character, candidate characters corresponding to the input character; receiving selection information so as to select one candidate character as a to-be-processed character; receiving, according to correspondence between the selection information and a candidate character position, a candidate character in the position corresponding to the selection information as the to-be-processed character; and processing the to-be-processed character.

3 Claims, 4 Drawing Sheets

(56) References Cited

U.S. PATENT DOCUMENTS

| | | | |
|---|---|---|---|
| 2007/0186192 A1* | 8/2007 | Wigdor | 715/864 |
| 2009/0077464 A1 | 3/2009 | Goldsmith et al. | |
| 2009/0115644 A1* | 5/2009 | Hsieh | 341/23 |
| 2010/0225599 A1* | 9/2010 | Danielsson et al. | 345/173 |
| 2011/0099506 A1* | 4/2011 | Gargi et al. | 715/773 |
| 2011/0302518 A1* | 12/2011 | Zhang | 715/773 |
| 2012/0124527 A1* | 5/2012 | Fujii | 715/863 |
| 2012/0320064 A1* | 12/2012 | Hu | 345/467 |
| 2013/0205242 A1* | 8/2013 | Colby | 715/773 |

FOREIGN PATENT DOCUMENTS

| | | | |
|---|---|---|---|
| CN | 101299180 A | 11/2008 | |
| CN | 101393506 A | 3/2009 | |
| CN | 101706677 A | 5/2010 | |
| WO | 2009/034220 A1 | 3/2009 | |

OTHER PUBLICATIONS

International Search Report issued May 1, 2012 in corresponding International Application No. PCT/CN2011/072607.

Extended European Search Report dated Dec. 15, 2014 in corresponding European Patent Application No. 11744263.2.

\* cited by examiner

INFORMATION PROCESSING METHOD AND TERMINAL DEVICE

CROSS-REFERENCE TO RELATED APPLICATIONS

This application is a continuation of International Application No. PCT/CN2011/072607, filed on Apr. 11, 2011, which is hereby incorporated by reference in its entirety.

TECHNICAL FIELD

Embodiments of the present invention relate to information processing technologies, and in particular, to an information processing method and a terminal device.

BACKGROUND

With the development of the communications technology, more and more application functions have been integrated into a terminal device, and in the foregoing application functions, a requirement for inputting a character in an input box may be involved. Generally speaking, after receiving an input character input by a user, the terminal device may display, according to the input character and in stripe structure order, candidate characters corresponding to the input character. After receiving selection information triggered by a function key or screen touching by the user on the terminal device, the terminal device may acquire a candidate character, selected in the selection information, as a to-be-processed character according to the selection information, so as to process the to-be-processed character.

In the prior art, because the terminal device displays, in the stripe structure order, the candidate characters corresponding to the received input character, a visual error of the user may be easily caused, so that the position of each candidate character in the strip structure may be easily misread, which leads to decreased display efficiency and display accuracy.

SUMMARY

Embodiments of the present invention provide an information processing method and a terminal device, for improving display efficiency and display accuracy.

An embodiment of the present invention provides an information processing method, including:
  receiving an input character input by a user;
  displaying, according to the input character and in a ring arrangement around the input character, candidate characters corresponding to the input character;
  receiving selection information, for selecting one candidate character as a to-be-processed character;
  acquiring, according to correspondence between the selection information and a candidate character position, a candidate character in the position corresponding to the selection information as the to-be-processed character; and
  processing the to-be-processed character.

An embodiment of the present invention further provides a terminal device, including:
  a first receiving module, configured to receive an input character input by a user;
  a displaying module, configured to display, according to the input character and in a ring arrangement around the input character, candidate characters corresponding to the input character;
  a second receiving module, configured to receive selection information, for selecting one candidate character as a to-be-processed character;
  an acquisition module, configured to acquire, according to correspondence between the selection information and a candidate character position, a candidate character in the position corresponding to the selection information as the to-be-processed character; and
  a processing module, configured to process the to-be-processed character.

It can be known from the foregoing technical solutions that, after receiving an input character input by a user, in the embodiments of the present invention, candidate characters corresponding to the input character are displayed in a ring structure according to the input character, so that a candidate character in a position corresponding to received selection information as a to-be-processed character can be acquired according to correspondence between the selection information and the candidate character position so as to process the to-be-processed character. Because a terminal device displays the candidate characters corresponding to the received input character in a ring structure, a user's visual error can be avoided, so that a position of each candidate character in the ring structure will not be misread, thereby improving display efficiency and display accuracy.

BRIEF DESCRIPTION OF DRAWINGS

To illustrate the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more clearly, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be noted that: a terminal device involved in the embodiments of the present invention includes but is not limited to a mobile phone, a personal digital assistant (Personal Digital Assistant, PDA for short), a wireless handheld device, a personal computer, a wireless netbook, a portable computer, an MP3 player, and an MP4 player.

Figure 1:
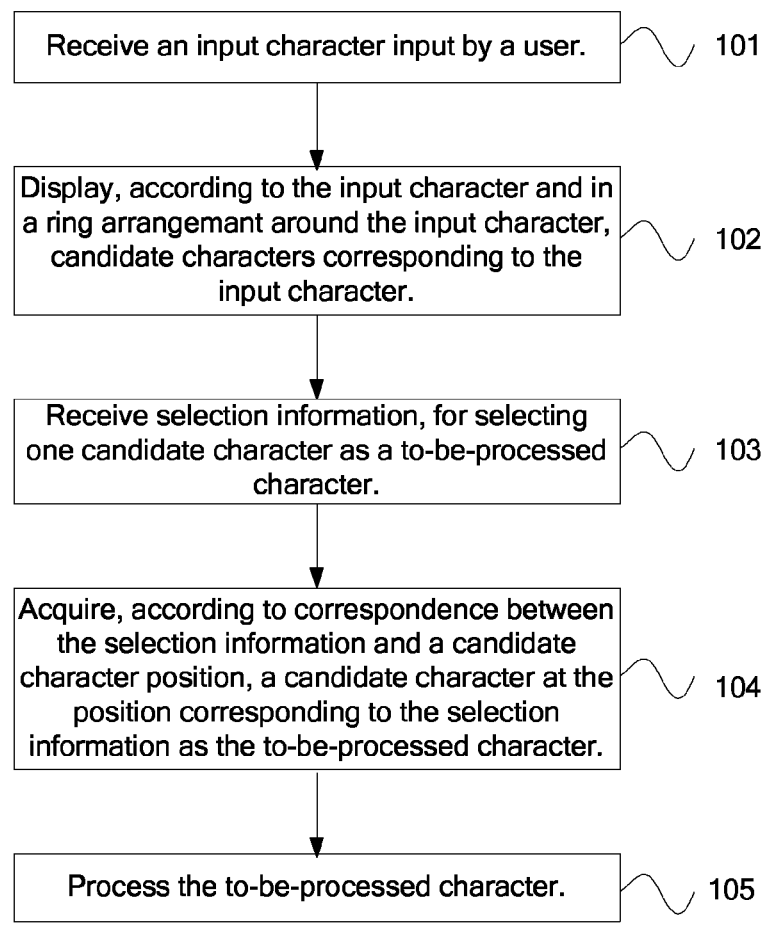
FIG. 1 is a schematic flowchart of an information processing method according to a first embodiment of the present invention.

FIG. 1 is a schematic flowchart of an information processing method according to a first embodiment of the present invention. As shown in FIG. 1, the information processing method of the embodiment may include the following steps.

Step 101: Receive an input character input by a user.

Step 102: Display, according to the input character and in a ring arrangement around the input character, candidate characters corresponding to the input character.

Figure 4:
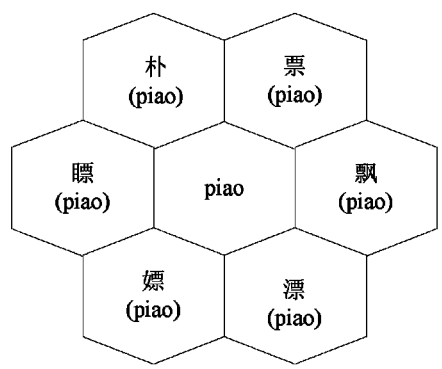
FIG. 4 is a schematic displaying diagram of candidate characters in an information processing method according to the first embodiment of the present invention.

Specifically, a terminal device may display, according to the input character and around the input character, the candidate characters corresponding to the input character, and as shown in FIG. 4, the input character is a hexagon, around which display altogether six candidate characters in six directions: upper left, left, lower left, upper right, right, and lower right. As the candidate characters are arranged around the input character, the number of candidate characters arranged around the input character may be set as required. For instance, the input character is set to an octagon, around which may display eight candidate characters.

Step 103: Receive selection information, for selecting one candidate character as a to-be-processed character.

Specifically, for the selection information, a control sensor may be used for receiving the selection information. For instance: by a gravity sensor or a displacement sensor, receive the selection information triggered by performing an action on the terminal device by the user.

Step 104: Acquire, according to correspondence between the selection information and a candidate character position, a candidate character in the position corresponding to the selection information as the to-be-processed character.

Before this step, the terminal device in the embodiment of the present invention may also further establish correspondence between selection information and a candidate character position, as shown in table 1.

TABLE 1

Correspondence between selection information and a candidate character position

| Selection Information | Candidate Character Position |
|---|---|
| Selection information 1 indicating an upper left position | Upper left position |
| Selection information 2 indicating an upper right position | Upper right position |
| Selection information 3 indicating a left position | Left position |
| Selection information 4 indicating a right position | Right position |
| Selection information 5 indicating a lower left position | Lower left position |
| Selection information 6 indicating a lower right position | Lower right position |

Step 105: Process the to-be-processed character.

Figure 5:
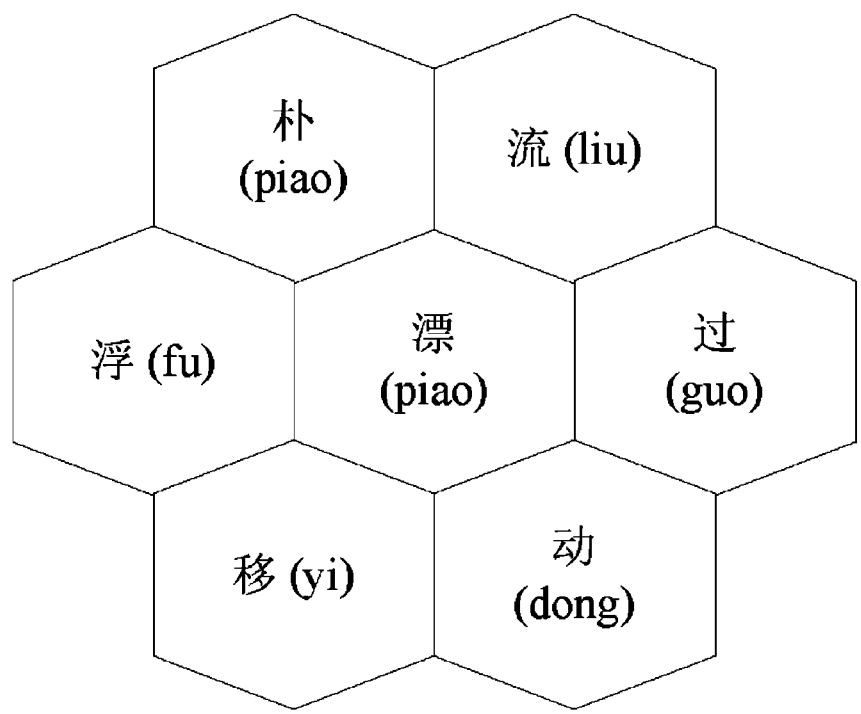
FIG. 5 is a schematic displaying diagram of processing the to-be-processed character in the information processing method according to the first embodiment of the present invention.

Specifically, the terminal device may display the to-be-processed character in an input box; or the terminal device may further display the to-be-processed character in an input box and display the associated characters related to the to-be-processed character around the to-be-processed character, as shown in FIG. 5.

In the embodiment of the present invention, after receiving an input character input by a user, candidate characters corresponding to the input character are displayed in a ring structure according to the input character, so that a candidate character in a position corresponding to received selection information can be acquired as a to-be-processed character according to correspondence between the selection information and the candidate character position so as to process the to-be-processed character. Because a terminal device displays, in a ring structure, the candidate characters corresponding to the received input character, a visual error of the user can be avoided, so that a position of each candidate character in the ring structure will not be misread, thereby improving display efficiency and display accuracy.

Figure 2:
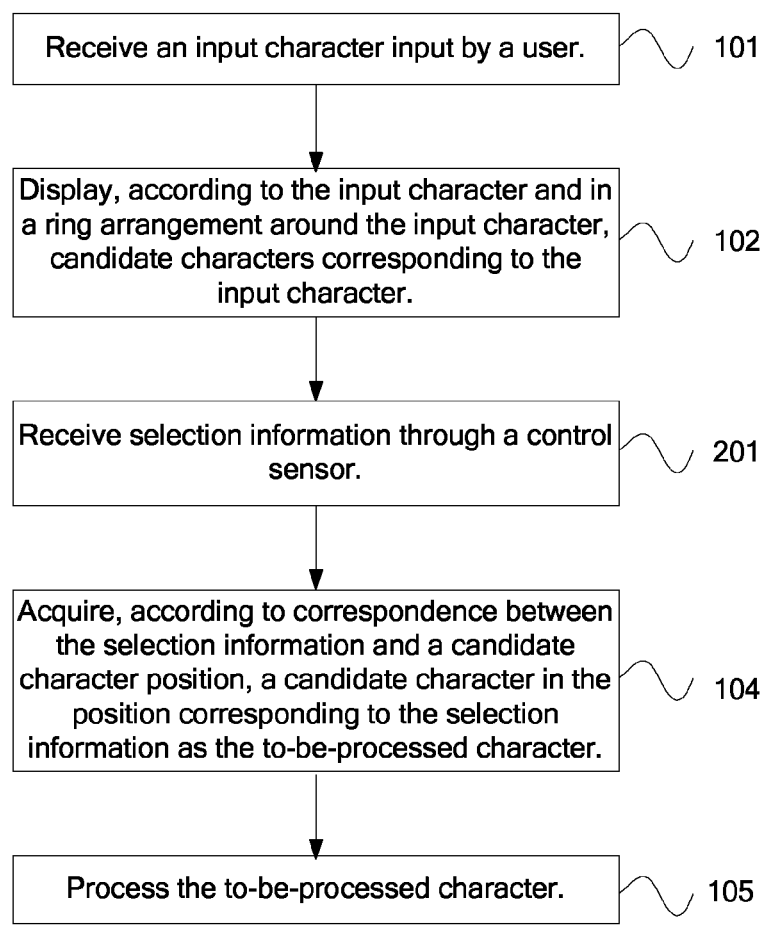
FIG. 2 is a schematic flowchart of an information processing method according to a second embodiment of the present invention.

FIG. 2 is a schematic flowchart of an information processing method according to a second embodiment of the present invention. As shown in FIG. 2, step 103 in the embodiment may specifically include the following steps.

Step 201: Receive the selection information through a control sensor.

Specifically, a terminal device may identify, through a control sensor, such as a gravity sensor or a displacement sensor, different actions performed by a user on the terminal device, and according to preset correspondence between an action performed by a user on a terminal device and selection information, receive selection information corresponding to an identified action performed by the user on the terminal device, where the correspondence between the action performed by the user on the terminal device and the selection information may be as shown in FIG. 2.

TABLE 2

Correspondence between an action performed by a user on a terminal device and selection information

| Action Performed by a User on a Terminal Device | Selection Information |
|---|---|
| Tilting a terminal device to the upper left | Selection information 1 indicating an upper left position |
| Tilting a terminal device to the upper right | Selection information 2 indicating an upper right position |
| Tilting a terminal device to the left | Selection information 3 indicating a left position |
| Tilting a terminal device to the right | Selection information 4 indicating a right position |
| Tilting a terminal device to the lower left | Selection information 5 indicating a lower left position |
| Tilting a terminal device to the lower right | Selection information 6 indicating a lower right position |
| Lifting a terminal device upward | Selection information 7 indicating a previous page |
| Lifting a terminal device downward | Selection information 8 indicating a next page |

In this embodiment, selection information triggered by an action performed by a user on a terminal device is received through a control sensor, which can avoid a problem of long operation duration or low reliability resulting from that in the prior art the terminal device receives selection information triggered by the user through a function key on the terminal device, thereby improving selection efficiency and selection reliability of candidate characters.

It should be noted that: for brevity, the foregoing method embodiments are described as a series of actions. However, a person skilled in the art should understand that the present invention is not limited to the order of the described actions, because according to the present invention, some steps may adopt other order or occur simultaneously. It should be further understood by a person skilled in the art that the described embodiments are all exemplary embodiments, and the involved actions and modules are not necessarily required by the present invention.

In the foregoing embodiments, description of each embodiment has respective focuses. For a part that is not described in detail in a certain embodiment, reference may be made to related descriptions in other embodiments.

Figure 3:
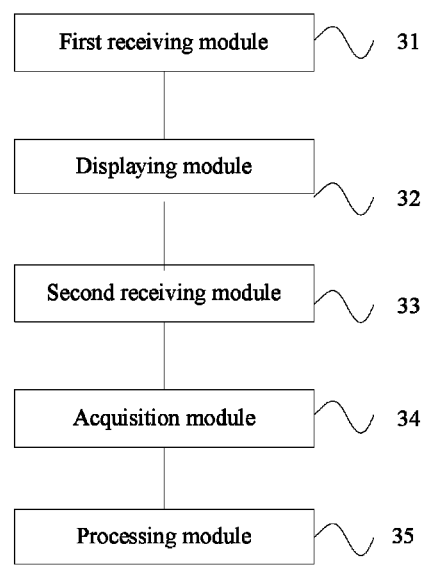
FIG. 3 is a structural schematic diagram of a terminal device according to a third embodiment of the present invention.

FIG. 3 is a structural schematic diagram of a terminal device according to a third embodiment of the present invention. As shown in FIG. 3, the terminal device in this embodiment may include a first receiving module 31, a displaying module 32, a second receiving module 33, an acquisition module 34, and a processing module 35. The first receiving module 31 is configured to receive an input character input by a user; the displaying module 32 is configured to display, in a ring structure according to the input character received by the first receiving module 31, candidate characters corresponding to the input character; the second receiving module 33 is configured to receive selection information, for selecting one candidate character displayed by the displaying module 32 as a to-be-processed character; the acquisition module 34 is configured to acquire, according to correspondence between the selection information and a candidate character position, a candidate character in the position corresponding to the selection information received by the second receiving module 33 as the to-be-processed character; and the processing module 35 is configured to process the to-be-processed character.

The methods in the first and second embodiments of the present invention may both be implemented by the terminal device provided in the embodiment of the present invention.

Specifically, the displaying module 32 in this embodiment, specifically, may display, according to the input character and around the input character, the candidate characters corresponding to the input character.

Specifically, the processing module 35 in this embodiment, specifically, may display the to-be-processed character in an input box; or may also display the to-be-processed character in an input box and display, around the to-be-processed character, associated characters related to the to-be-processed character.

In this embodiment, after a first receiving module receives an input character input by a user, a terminal device displays, through a displaying module, according to the input character and in a ring structure, candidate characters corresponding to the input character, so that an acquisition module can acquire, according to correspondence between selection information and a candidate character position, a candidate character in the position corresponding to the selection information received by the second receiving module as a to-be-processed character, and the to-be-processed character is processed by a processing module. Because the displaying module of the terminal device displays, in the ring structure, the candidate characters corresponding to the received input character, a visual error of the user can be avoided, so that a position of each candidate character in the ring structure will not be misread, thereby improving display efficiency and display accuracy.

Specifically, the second receiving module 33, specifically, may receive the selection information through a control sensor. For instance, an action performed by the user on the terminal device may specifically be identified through a gravity sensor or a displacement sensor, and selection information corresponding to the identified action performed by the user on the terminal device is received according to preset correspondence between the action performed by the user on the terminal device and the selection information. by using the second receiving module to receive, through the control sensor, the selection information triggered by the action performed by the user on the terminal device, the terminal device can avoid a problem of long operation duration or low reliability resulting from that in the prior art the terminal device receives selection information triggered by the user through a function key on the terminal device, thereby improving the selection efficiency and selection reliability of candidate characters.

A person of ordinary skill in the art can understand that, all or part of the steps of the foregoing method embodiments may be implemented by a program instructing relevant hardware. The foregoing program may be stored in a computer readable storage medium. When the program runs, the preceding steps included in the method embodiments are performed. The foregoing storage medium may be various media capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that they may still make modifications to the technical solution described in the foregoing embodiments or make equivalent replacements to some technical features thereof; such modifications or replacements do not make essence of corresponding technical solutions depart from the scope of the technical solution of the embodiments of the present invention.

What is claimed is:

1. An information processing method performed by a terminal device, comprising:

receiving an input character input by a user;

displaying, according to the input character and in a ring arrangement around the input character, candidate characters corresponding to the input character, wherein the input character is Chinese phonetic alphabet, and the candidate characters are Chinese characters, the input character is shown in a hexagon, candidate characters are displayed altogether in six directions of the hexagon comprising: upper left, lower left, upper right, right, and lower right;

identifying, through a gravity sensor or a displacement sensor, an action performed by a user on the terminal device;

obtaining selection information corresponding to the action performed by a user on the terminal device, for selecting one candidate character as a to-be-processed character, wherein the correspondence between an action performed by a user on a terminal device and selection information comprises: tilting the terminal device to the upper left corresponding to selection information 1 indicating an upper left, tilting terminal device to the upper right corresponding to selection information 2 indicating an upper right position, tilting the terminal device to the left corresponding to selection information 3 indicating a left position, tilting the terminal device to the right corresponding to selection information 4 indicating a right position, tilting the terminal device to the lower left corresponding to selection information 5 indicating a lower left position, tilting the terminal device to the lower right corresponding to selection information 6 indicating a lower right position, lifting the terminal device upward corresponding to selection information 7 indicating a previous page, and lifting terminal device downward corresponding to selection information 8 indicating a next page;

determining, according to correspondence between the selection information and a candidate character position, a candidate character in the position corresponding to the selection information as the to-be-processed character without receiving any key pressing input from a user; and displaying the to-be-processed character in an input box; or displaying the to-be-processed character in an input box and displaying, around the to-be-processed character, associated characters related to the to-be-processed character.

2. A terminal device, comprising:
a first receiving module, configured to receive an input character input by a user;
a displaying module, configured to display, according to the input character and in a ring arrangement around the input character, candidate characters corresponding to the input character, wherein the input character is Chinese phonetic alphabet, and the candidate characters are Chinese character, the input character is shown in a hexagon, candidate characters are displayed altogether in six directions of the hexagon comprising: upper left, left, lower left, upper right, right, and lower right;
a second receiving module, configured to identify, through a gravity sensor or a displacement sensor, a action performed by a user on the terminal device, obtain selection information corresponding to the action performed by a user on the terminal device, to select one candidate character as a to-be-processed character, wherein the correspondence between an action performed by a user on a terminal device and selection information comprises: tilting the terminal device to the upper left corresponding to selection information 1 indicating an upper left, tilting the terminal device to the upper right corresponding to selection information 2 indicating an upper right position, tilting the terminal device to the left corresponding to selection information 3 indicating a left position, tilting the terminal device to the right corresponding to selection information 4 indicating a right position, tilting the terminal device to the lower left corresponding to selection information 5 indicating a lower left position, tilting the terminal device to the lower right corresponding to selection information 6 indicating a lower right position, lifting the terminal device upward corresponding to selection information 7 indicating a previous page, and lifting terminal device downward corresponding to selection information 8 indicating a next page;
an acquisition module, configured to determine, according to correspondence between the selection information and a candidate character position, a candidate character in the position corresponding to the selection information as the to-be-processed character without receiving any key pressing input from a user; and
a processing module, configured to display the to-be-processed character in an input box; or display the to-be-processed character in an input box and display, around the to-be-processed character, associated characters related to the to-be-processed character.

3. A terminal device, comprising:
a touch panel, configured to receive an input character input by a user;
a display, configured to display, according to the input character and in a ring arrangement around the input character, candidate characters corresponding to the input character, wherein the input character is Chinese phonetic alphabet, and the candidate characters are Chinese character, the input character is shown in a hexagon, candidate characters are displayed altogether in six directions of the hexagon comprising: upper left, left, lower left, upper right, right, and lower right;
a gravity sensor or a displacement sensor, configured to identify a action performed by a user on the terminal device;
a processor, configured to obtain selection information corresponding to the action performed by a user on the terminal device, to select one candidate character as a to-be-processed character, wherein the correspondence between an action performed by a user on a terminal device and selection information comprises: tilting the terminal device to the upper left corresponding to selection information 1 indicating an upper left, tilting the terminal device to the upper right corresponding to selection information 2 indicating an upper right position, tilting the terminal device to the left corresponding to selection information 3 indicating a left position, tilting the terminal device to the right corresponding to selection information 4 indicating a right position, tilting the terminal device to the lower left corresponding to selection information 5 indicating a lower left position, tilting the terminal device to the lower right corresponding to selection information 6 indicating a lower right position, lifting the terminal device upward corresponding to selection information 7 indicating a previous page, and lifting terminal device downward corresponding to selection information 8 indicating a next page;
the processor is further configured to determine, according to correspondence between the selection information and a candidate character position, a candidate character in the position corresponding to the selection information as the to-be-processed character without receiving any key pressing input from a user;
the display is further configured to display the to-be-processed character in an input box; or display the to-be-processed character in an input box and display, around the to-be-processed character, associated characters related to the to-be-processed character.

* * * * *